(12) United States Patent
Pace

(10) Patent No.: US 8,899,294 B2
(45) Date of Patent: Dec. 2, 2014

(54) LABELLING MACHINE FOR SLEEVE LABELS

(75) Inventor: Raffaele Pace, Parma (IT)

(73) Assignee: Sidel S.p.A., Parma (IT)

( * ) Notice: Subject to any disclaimer, the term of this patent is extended or adjusted under 35 U.S.C. 154(b) by 325 days.

(21) Appl. No.: 13/122,494

(22) PCT Filed: Oct. 8, 2008

(86) PCT No.: PCT/EP2008/063450
§ 371 (c)(1),
(2), (4) Date: Apr. 4, 2011

(87) PCT Pub. No.: WO2010/040397
PCT Pub. Date: Apr. 15, 2010

(65) Prior Publication Data
US 2011/0186236 A1  Aug. 4, 2011

(51) Int. Cl.
| | |
|---|---|
| *B65C 9/04* | (2006.01) |
| *B65C 9/18* | (2006.01) |
| *B65C 9/26* | (2006.01) |
| *B65C 3/06* | (2006.01) |
| *B29C 53/44* | (2006.01) |
| *B29C 63/42* | (2006.01) |
| *B29C 65/38* | (2006.01) |
| *B29C 65/78* | (2006.01) |
| *B29C 65/00* | (2006.01) |
| *B29C 65/22* | (2006.01) |
| *B29C 65/08* | (2006.01) |
| *B29C 65/10* | (2006.01) |
| *B29L 31/00* | (2006.01) |

(52) U.S. Cl.
CPC ............. *B65C 3/065* (2013.01); *B29C 53/44* (2013.01); *B29C 63/426* (2013.01); *B29C 65/38* (2013.01); *B29C 65/7847* (2013.01); *B29C 65/7885* (2013.01); *B29C 66/1122* (2013.01); *B29C 66/4322* (2013.01); *B29C 66/49* (2013.01); *B29C 66/636* (2013.01); *B29C 66/80* (2013.01); *B29C 66/81811* (2013.01); *B29C 65/224* (2013.01); *B29C 65/228* (2013.01); *B29C 66/8122* (2013.01); *B29C 66/81821* (2013.01); *B29C 65/08* (2013.01); *B29C 65/10* (2013.01); *B29C 66/83521* (2013.01); *B29L 2031/744* (2013.01)
USPC ............... 156/568; 156/567; 156/DIG. 26; 156/DIG. 33; 156/DIG. 37

(58) Field of Classification Search
USPC .......... 156/538, 539, 556, 567, 568, DIG. 26, 156/DIG. 33, DIG. 37
IPC ....................................... B65C 9/04,9/18, 9/16
See application file for complete search history.

(56) References Cited

U.S. PATENT DOCUMENTS 4,250,798 A * 2/1981 Yamato et al. ............... 493/306
4,801,348 A   1/1989 Takagaki
(Continued)

FOREIGN PATENT DOCUMENTS

EP  0479559   4/1992
GB  1091917   11/1967
(Continued)

*Primary Examiner* — Mark A Osele
(74) *Attorney, Agent, or Firm* — Shoemaker and Mattare

(57) ABSTRACT

A labeling machine has a carrousel having a frame at the periphery of which a plurality of mandrels are rotatably mounted, and, at angularly spaced positions around the carrousel, object feeding means, label feeding means and object removing means. Each mandel receives a label strip from the label feeding means, winds it around the body of the mandrel so that a leading end and a trailing end of the label strip overlap. The leading and trailing ends of the label strip are sealed to form a sleeve label. The label strips are sealed by heat sealing means which include a pulse heating bar.

12 Claims, 3 Drawing Sheets

(56) References Cited

U.S. PATENT DOCUMENTS

| | | | |
|---|---|---|---|
| 6,522,939 B1 * | 2/2003 | Strauch et al. | 700/116 |
| 7,582,882 B2 | 9/2009 | McLoskey et al. | |
| 7,870,882 B2 | 1/2011 | Panzetti | |
| 2006/0113024 A1 * | 6/2006 | Panzetti | 156/84 |
| 2007/0277933 A1 * | 12/2007 | Zacche et al. | 156/448 |
| 2008/0110572 A1 * | 5/2008 | Panzetti | 156/423 |

FOREIGN PATENT DOCUMENTS

| | | | | |
|---|---|---|---|---|
| GB | 1091917 A * | 11/1967 | | H05B 3/06 |
| GB | 2011344 | 7/1979 | | |
| JP | 07-242216 | 9/1995 | | |
| JP | 2001-282360 | 10/2001 | | |
| JP | 2002-179037 | 6/2002 | | |
| WO | 2004020291 | 3/2004 | | |
| WO | WO 2004/020291 A1 * | 3/2004 | | B29C 3/06 |
| WO | WO 2004020291 A1 * | 3/2004 | | B29C 3/06 |
| WO | 2004043877 | 5/2004 | | |
| WO | WO 2004/043877 A1 * | 5/2004 | | C04B 41/51 |
| WO | WO 2004043877 A1 * | 5/2004 | | C04B 41/51 |
| WO | 2007148189 | 12/2007 | | |
| WO | WO 2007/148189 A1 * | 12/2007 | | B65C 3/06 |
| WO | WO 2007148189 A1 * | 12/2007 | | B65C 3/06 |

* cited by examiner

LABELLING MACHINE FOR SLEEVE LABELS

FIELD OF THE INVENTION

The present invention relates to a labelling machine of the type that uses heat-shrinkable sleeve labels to wrap around a container to be labelled.

BACKGROUND ART

Labelling machines for heat-shrinkable sleeve labels are known and used for labelling containers or objects of various shapes with a label that wrap them up completely. Heat-shrinkable sleeve labels are particularly suitable in the case of containers or objects of very irregular shapes, because they are able to fit these shapes exactly during the heat-shrinkage step.

These labelling machines are of two main categories. The first type provides for a continuous reel of flattened tubular labels, which are cut at the appropriate length and are then opened just before wrapping them around a container. The containers with their own sleeve labels are passed through a suitable oven wherein the heat provides for shrinking the sleeve label on the container. The second category comprises machines wherein the sleeve is not pre-formed, but is created from a roll film of labels that are cut, wound around a mandrel to overlap their leading and trailing ends, welded or glued to form the sleeve label and finally transferred onto the object to be labelled before the shrinking step.

In the labelling machines of this second type, commonly the welding is performed by means of ultra-sound heads, one for each container/mandrel unit, that are positioned on the carrousel carrying the mandrel/container units, internally with respect to the circle delimited by the containers so positioned on the carrousel. Each ultra-sound head is mounted on a frame that is moved, by means of electrical and/or pneumatic actuators, forward and backward to approach or distance the corresponding mandrel and, hence, the sleeve label in place thereon. During the welding operation, when the ultra-sound head is close to a sleeve wound on a mandrel, it is moved vertically in order to weld together the overlapping ends of the label, thus forming the sleeve.

This system has however some disadvantages. First of all, the provision of a plurality of ultra-sound heads, each mounted on a frame that performs a complicate motion, can be subject to frequent damages and causes long and difficult maintenance operations. Additionally, the quality of the welding is not optimal, as it can be uneven or not linear or not perfectly vertical.

SUMMARY OF THE INVENTION

It is therefore an object of the present invention to provide a labelling machine for sleeve labels that overcomes the above drawbacks, as defined in the appended claims whose definitions are integral part of the present description.

Further features and advantages of the present invention will be better understood from the description of a preferred embodiment, which is given below by way of a non-limiting illustration.

DETAILED DESCRIPTION OF THE INVENTION

Figure 1:
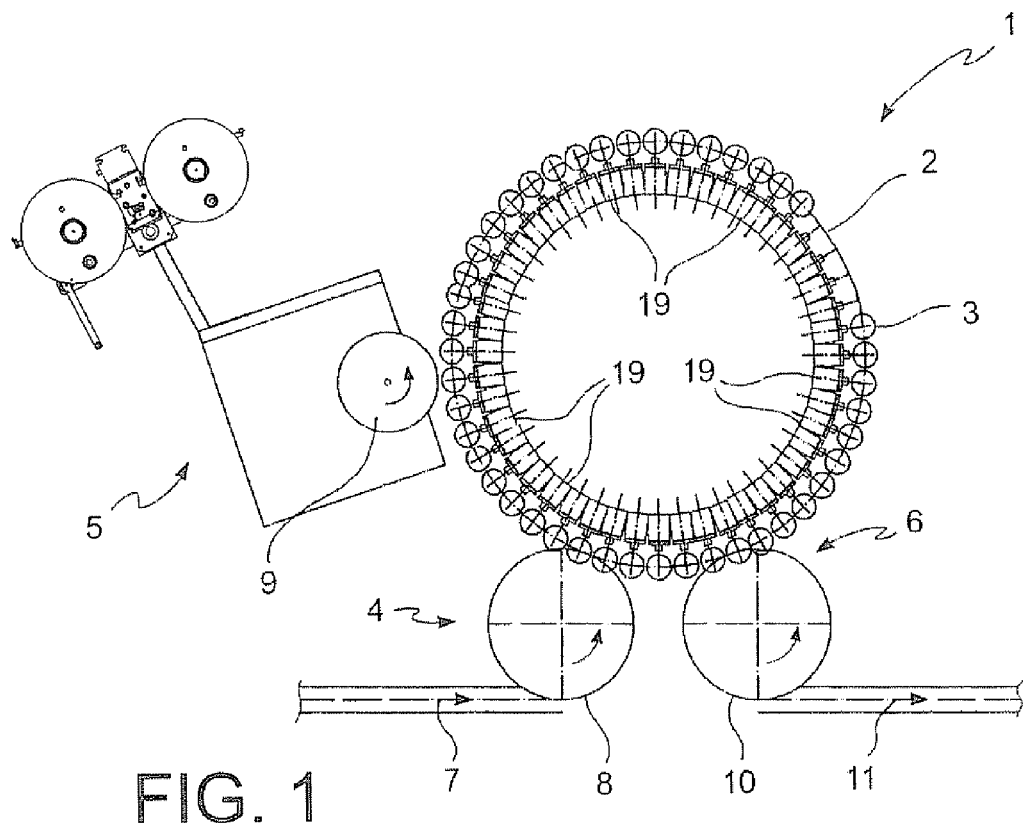
FIG. 1 shows a plan schematic view of the inventive labelling machine.
Figure 2:
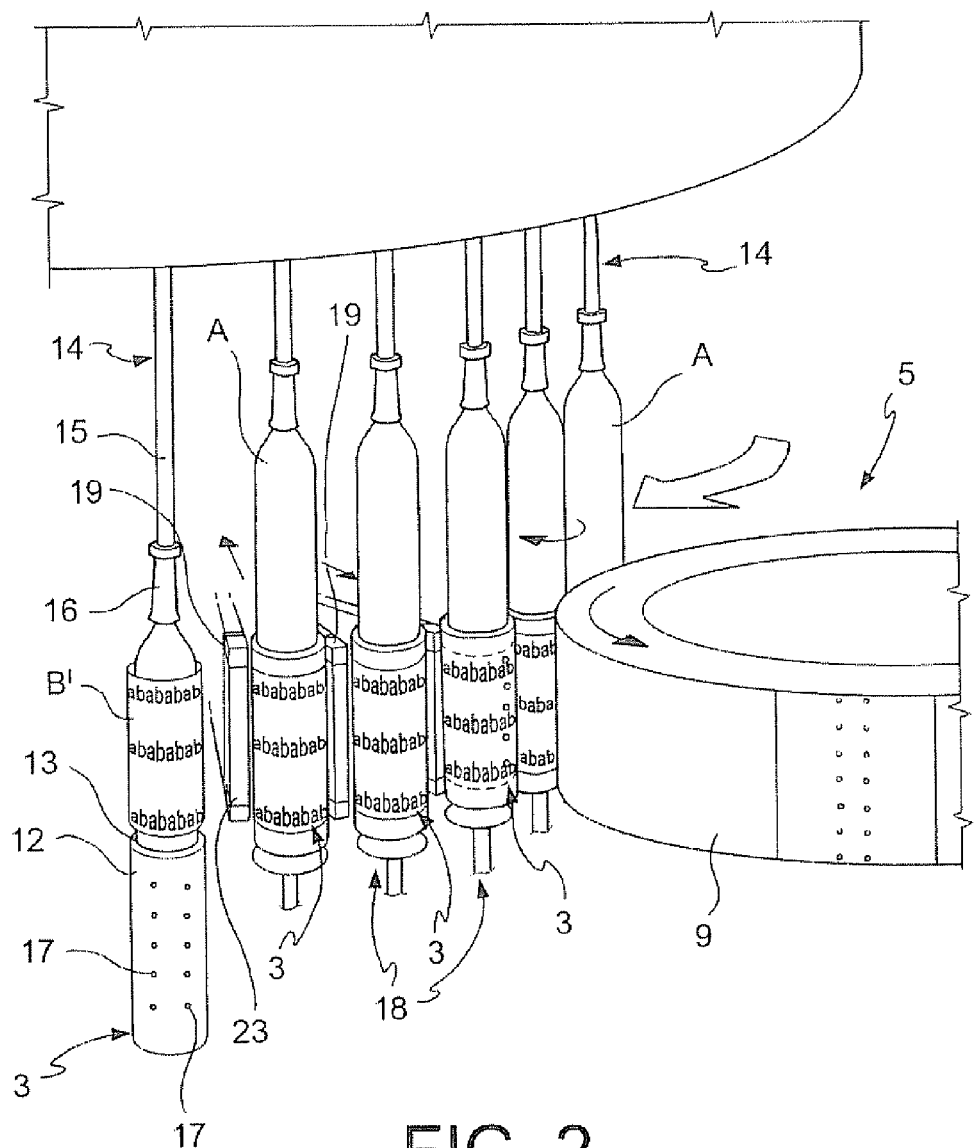
FIG. 2 shows a perspective view of a particular of the machine of FIG. 1.

According to a first inventive embodiment, shown in FIGS. 1 and 2, the labelling machine 1 comprises a carrousel 2, having a frame at the periphery of which a plurality of mandrels 3 are rotatably mounted. The labelling machine 1 also comprises, at angularly spaced positions around the carrousel 2, object feeding means 4, label feeding means 5 and object removing means 6.

The object feeding means 4 comprise transport means 7 such as a linear conveyor belt, coupled to an Archimedes screw to distance the objects at an appropriate reciprocal distance, and a distribution wheel 8, preferably a star wheel, rotating counter-wise with respect to the direction of rotation of the carrousel 2.

The label feeding means 5 are positioned downstream the said object feeding means 4 and comprise roll feeding means for feeding a continuous film of labels, cutting means for cutting the said film into discrete label strips B and a vacuum drum 9 that receives the said label strips B, retain them by vacuum and deliver the said label strips B onto the said mandrels 3. The structure and the functioning of the vacuum drum 9 is generally known and therefore it will not be described in more details.

The object removing means 6 are positioned down stream the said label feeding means 5, generally close to the said object feeding means 4 so that an object can be moved around the carrousel of almost 360° before leaving it. The object removing means 6 comprise a distribution wheel 10, preferably a star wheel, rotating counter-wise with respect to the direction of rotation of the carrousel 2, that receives the labelled objects exiting the carrousel 2 and transfers them onto transporting means 11. The transporting means 11 bring the said objects into heating means, such as an oven (not shown), that provide for heat-shrinking of the labels to completely wrap up the objects.

As illustrated on FIG. 2, the mandrels 3 have a body 12, of substantially cylindrical shape, but slightly tapered upwardly and having a substantially flat top forming a plate 13 that supports an object A during its whole permanence on the carrousel 2. The object A is set firmly on place by setting means 14 that are mounted on the top part of the frame of the carrousel 2, in alignment with the longitudinal axis of the cylindrical body 12 of mandrel 3. The setting means 14 comprise a shaft 15 having a proximal end engaged with the top frame of the carrousel 2, typically through cam means (not shown), and a distal end terminating with a bell 16 for engaging a top portion of an object A.

The setting means 14 are actuated by the said cam means to move vertically along its axis, so that, when an object A is picked up on a mandrel 3, the setting means 14 are lowered to engage the top of an object A and pressing it against the plate 13.

The surface of the substantially cylindrical body 12 of the mandrel 3 comprises a plurality of openings 17 that are in flow communication with passages for vacuum defined internally to the body 12. Such passages are connected to suction means (not shown) that provide for a source of vacuum.

Each mandrel 3 is mounted on an actuator means 18 that allows the mandrel 3 to be rotated, while the vertical motion along its own axis is performed through cam means, not shown.

The rotation of the mandrel 3 can be driven by the motor means of the carrousel 2, through appropriate gear or belt systems, or each mandrel 3 can be driven by a dedicated motor means (not shown) such as a torque motor and particularly a brushless motor. Such a rotation is performed when the mandrel 3 is close to the vacuum drum 9, during the step of picking up a label strip B and winding it around the mandrel 3 itself.

The vertical movement of the mandrel 3 is typically driven by the motor means of the carrousel 2, through appropriate cam means (not shown), and will be performed as will be described below.

The carrousel 2 comprises a plurality of heat sealing means 19, one for each mandrel 3, that are positioned internally with respect to the mandrels 3. Each heat sealing means 19 is aligned to a radius of the carrousel 2 and is mounted on a slide means (not shown) that allows a forward and backward radial movement, so that the heat sealing means 19 either contact or are distanced from the label strip B wound on the associated mandrel 3.

Figure 4:
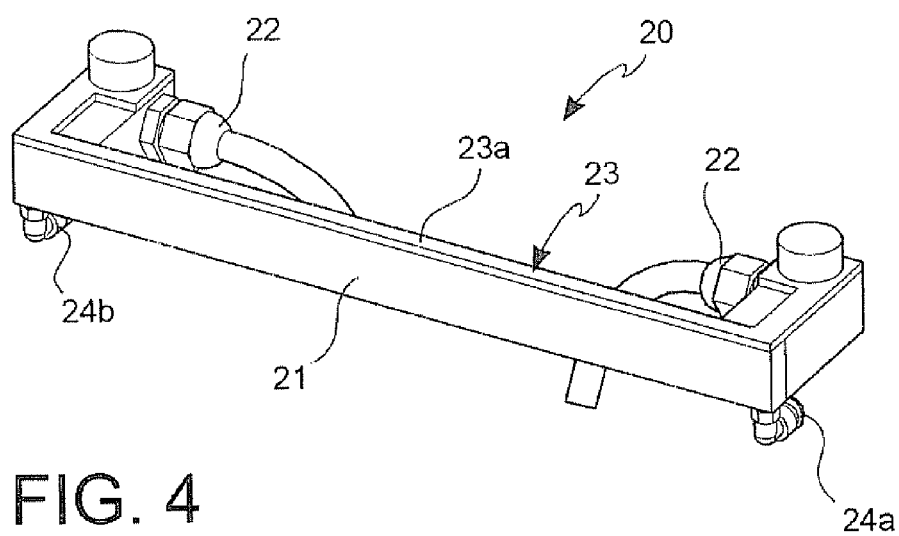
FIG. 4 shows a perspective view of the main element of a heat sealing means to be used in the inventive machine.

According to the invention, the heat sealing means 19 preferably comprise, as main constituting element, a pulse heating bar 20, which is represented on FIG. 4. Typically, the said pulse heating bar 20 is a so called CIRUS (Cermet Integrated Resistive Ultrafast Sensorless) heater produced by ROPEX GmbH.

Such a pulse heating bar 20 is of substantially C-shape. It comprises a parallelepiped body 21, which is made of conductive material such as a metal (aluminium), and which is connected, at the two parallel projections of the C-shape, through suitable electrical connectors 22 to a power source (not shown). The parallelepiped body 21 of the pulse heating bar carries on a side thereof a heating element 23, whose main linear portion 23a is designed to contact the surface to be sealed. The heating element 23 is made of a stainless steel elongated plate with a shape matching the body 21 of the bar. On the heating element 23 several layers of glass-ceramic materials are applied as an insulation. To such glass-ceramic layers, further layers of glass-metal materials are then applied in a defined geometry. Finally, a protective coating is applied. At each layer application, the piece is sintered at 850° C. Between the parallelepiped body 21 and the heating element 23 a channel is formed, wherein a cooling fluid (such as water) can be circulated. Cooling fluid connections 24a, 24b are so provided.

The heating element 23 of said pulse heating bar 20 is operated by electrical impulses that generate pulsing heating. The design of the device is such as to allow extremely short slope times for both heating and cooling (typically around 6000° K./sec for heating and 3000° K./sec for cooling) so that the bar is cooled immediately after contact with the label strip B to be sealed.

The pulse heating bars 20 are mounted with their body 21 vertically on the slide means, so that each elongated heating element 23 is aligned with the vertical axis of the mandrel 3. A suitable actuator means (not shown) commanded by a PLC system acts on the slide means to move the said heat sealing means 19 from a rest position to a contact position with the label strip B for a time sufficient to seal it and then to retract the said heat sealing means 19 from the contact position to the rest position again.

The operation of the machine is as follows.

When a mandrel 3 with an object A engaged thereon arrives in proximity of the vacuum drum 9 carrying the label strips B, it is made to rotate counter-wise with respect to the direction of rotation of the vacuum drum 9, so that a label strip B is released from the vacuum drum 9 to the mandrel 3 and it winds around the mandrel 3, as shown on FIG. 2. This operation is facilitated by the fact that vacuum is shut off on the vacuum drum for this label strip B, while the openings 17 on the surface of the mandrel 3 are put into flow communication with respective suction means, so that the label strip B is retained on the mandrel 3 by vacuum.

Just downstream the label pick-up position, the PLC system of the machine operates the heat sealing means 19 to contact the label strip B on the point of overlap between leading and trailing end of the label strip B, so that a sleeve label B' is formed, as explained above. After sealing, the heat sealing means 19 are retracted to the rest position.

After the sleeve label B' is so formed, the actuator means 18 move the mandrel 3 downwardly, while simultaneously the vacuum is switched off. The setting means 14 are also operated by their respective cam means to follow this movement, to maintain the object A in position on the mandrel 3.

Therefore, thanks to the tapered profile of the mandrel 3, the sleeve label B' disengages from the surface of the body 12. As the object A is lowered together with the mandrel 3, the said object A inserts into the sleeve label B', as illustrated on the left part of FIG. 2. In such condition, the object A carrying the sleeve label B' reaches the object removing means 6 and is removed as explained above.

Figure 3:
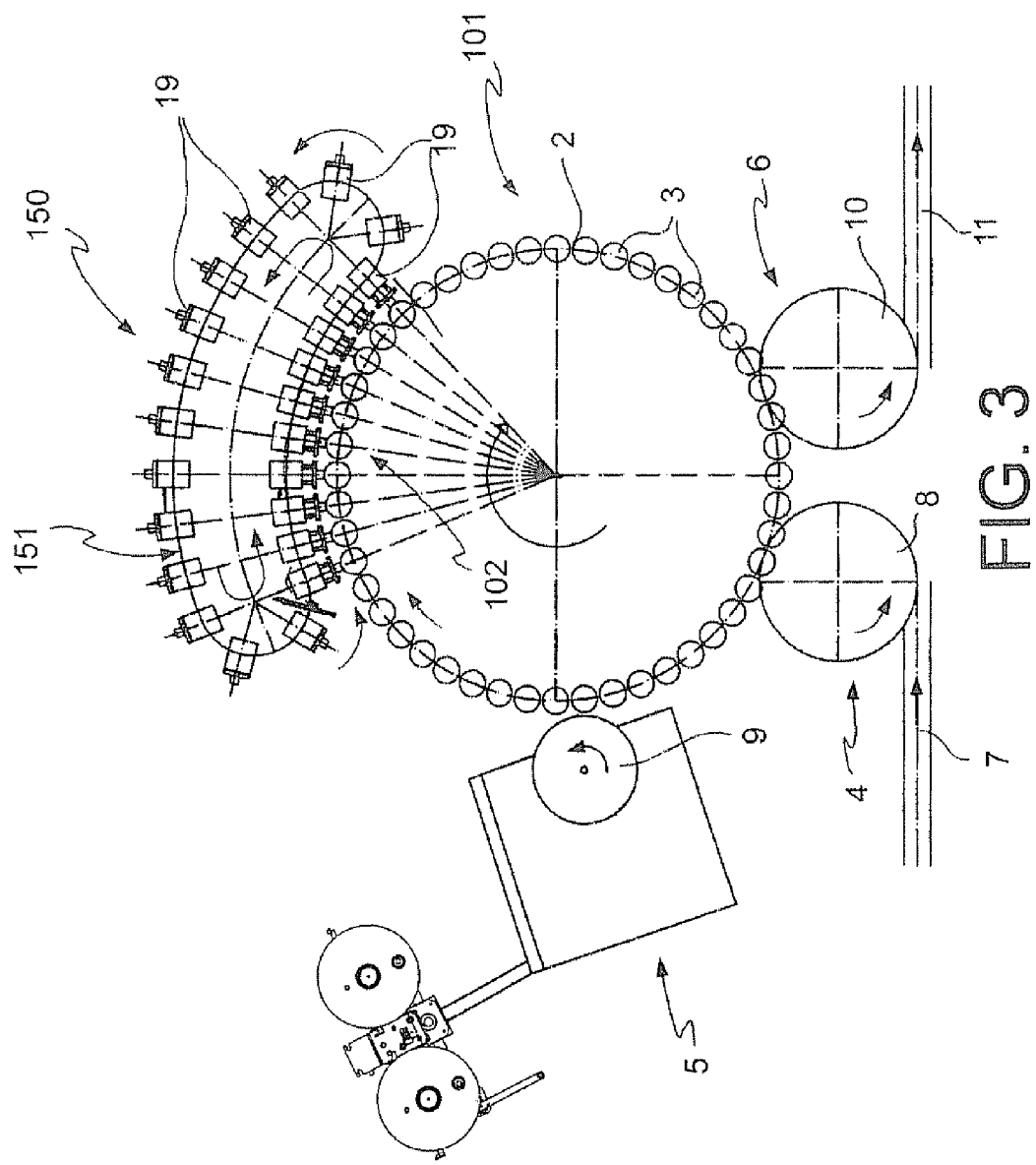
FIG. 3 shows a plan schematic view of a second embodiment of the inventive machine.

In a further embodiment of the inventive machine, shown in FIG. 3, wherein the same numbers indicate the same elements above described for the first embodiment, the heat sealing means 19 are not associated with the carrousel 2, but are mounted on a sealing station 150.

In this embodiment too, the labelling machine 101 comprises a carrousel 2, having a frame at the periphery of which a plurality of mandrels 3 are rotatably mounted. The labelling machine 101 also comprises, at angularly spaced positions around the carrousel 2, object feeding means 4, label feeding means 5 and object removing means 6, whose structure and functioning is analogous to the ones described above.

The sealing station 150 is located at an angularly spaced downstream position with respect to the label feeding means 4, in operative connection with a circular-arc portion 102 of the carrousel 2.

According to a particular embodiment of the invention, the sealing station 150 is modular, i.e. it can be removed or moved to different sections of the carrousel, according to particular needs. In this case, the sealing station 150 will be provided with suitable linking means to link the sealing station 150 to the periphery of the frame of carrousel 2.

The sealing station 150 comprises a plurality of heat sealing means 19 mounted on slide means. The structure and operation of both the sealing means 19 and their corresponding slide means are analogous to the one described above.

The slide means on their turn are mounted on closed-loop transport means 151, a portion of which describes an arc of circle of a complementary shape with respect to the circular-arc portion 102 of the carrousel 2 which is coupled to. The closed-loop transport means 151 are driven by the carrousel 2 motorization, through gear or belt systems, or by an independent motorization, so that the heat sealing means 19 move along the said closed-loop transport means 151 synchronously with respect to the mandrels 3 on the carrousel 2.

The number of heat sealing means 19 on the closed-loop transport means 151 can be the same of the mandrels 3 on the carrousel 2, or preferably it can be a sub-multiple of the mandrels 3, as the number of mandrels 3 comprised in the circular-arc portion 102 of the carrousel 2 can be suitably set according to user's needs.

The operation of the inventive machine 101 is similar to the operation of the first embodiment described previously, with the difference that the sealing step is performed in correspondence with the circular-arc portion 102 of the carrousel 2. Once a mandrel 3 with an object A carried thereon approaches the said circular-arc portion 102, the heat sealing means 19 are operated to form the sleeve label B'. As the said heat sealing means 19 are positioned externally with respect to the carrousel 2, the mandrels 3 should be orientated in such a way that the overlapping leading and trailing ends of the label strip B are faced outwardly, in alignment with the pulse heating bar 20.

While the embodiment of FIG. 3 has been above described in relation to the heat sealing means 19 and in particular to the pulse heating bar 20, it should be understood that it may analogously work with other types of sealing elements, such as ultra-sound sealing heads or hot air sealing bars as known to the skilled man.

The advantages of the inventive labelling machine 1, 101 are various.

The provision of a heat sealing means 19 comprised of a heating bar allows the sealing be obtained simultaneously along the whole edge of the label. The sealing appearance is therefore better than with the ultra-sound heads of the prior art, as it is even, straight and perfectly vertical.

The use of a pulse heating bar 20 of the type described above as heating means is also advantageous to prevent possible burns to the operators of the machine. In fact, the bar is always cool at the touch, even immediately after its use.

The operation of the slide means for the heat sealing means 19 of the invention is simple, as it just consists of a forward and backward motion. This reduces the risk of failures of the device.

The second embodiment described above has a further advantage, consisting in the fact that the heat sealing means 19 are out of the carrousel, wherein their hindrance can make difficult any intervention on the machine for maintenance. Moreover, the number of heat sealing means 19 can be reduced, with obvious cost savings.

As said above, the sealing station 150 can also be modular, which improves the maintenance operations and makes the machine more flexible.

It will be appreciated that only particular embodiments of the present invention have been described herein, to which those skilled in the art will be able to make any and all modifications necessary for its adjustment to specific applications, without however departing from the scope of protection of the present invention as defined in the annexed claims.

The invention claimed is:

1. A labeling machine for labeling bottles, said machine having a programmable logic controller and comprising
    a carousel having a frame, said frame defining a periphery,
    a plurality of mandrels for supporting said bottles, each mandrel having an axis and being rotatably mounted on said periphery,
    actuators for rotating each said mandrel about its axis and for allowing sand mandrel to move vertically along its axis,
    an infeed conveyor for feeding bottles onto said carousel,
    a label feeder for feeding a continuous film of labels,
    a cutter for cutting the continuous film of labels into label strips, the label strips each having a trailing end and a leading end,
    a vacuum drum for transferring each of said label strips from said cutter onto one of said mandrels with said trailing end and said leading end overlapping each other to define overlapping ends,
    a pulse heating sealing bar connected to a power source and having a heating element, said sealing bar comprising a body carrying a heating element and having a channel through which a coolant may be circulated, the heating element comprising a plate on which plural layers of glass-ceramic materials are applied, to such glass-ceramic layers further layers of glass-metal materials and a final protective coating being applied,
    a slide activated through said programmable logic controller that performs the following actions: moving said pulse heating sealing bar from a rest position, in which said pulse heating sealing bar is distanced from said overlapping ends, to a contact position, wherein said heating element of said pulse heating sealing bar contacts said overlapping ends for sealing said overlapping ends together to form a sleeve label, and retracting said pulse heating sealing bar from said contact position to said rest position,
    a first distribution wheel rotating counter-wise with respect to the direction of rotation of the carousel;
    the label feeder is positioned downstream from the bottle feeder and feeds a continuous film of labels, cuts the film into discrete label strips and further comprises a vacuum drum that receives the label strips, retains them by vacuum and delivers the label strips onto the mandrels;
    the mandrels have a body, of substantially cylindrical shape, but slightly tapered upwardly and having a substantially flat top forming a plate that supports one of said bottles while on the carousel, the bottle being set firmly on place by a setting mechanism mounted on the top part of the frame of the carousel, in alignment with the longitudinal axis of the body of mandrel, the surface of the body of the mandrel comprising a plurality of openings that are in flow communication with passages for vacuum defined internally to the body, such passages being connected to a source of vacuum;
    the setting mechanism comprising a shaft having a proximal end engaged with the top frame of the carousel, and a distal end terminating with a bell for engaging a top portion of a bottle, and the setting mechanism moves vertically, so that, when a bottle is picked up on a mandrel, the setting mechanism is lowered to engage the top of the bottle and press it against the plate;
    and further comprising
    a second distribution wheel rotating counter-wise with respect to the direction of rotation of the carousel, that receives the labeled bottles exiting the carousel and transfers them onto an outfeed conveyor that delivers the bottles to a heating device for heat-shrinking of the labels around the bottles.

2. A labeling machine according to claim 1, wherein the pulse heating sealing bar is operated by electrical impulses that generate pulsing heating.

3. A labeling machine according to claim 1, wherein each pulse heating sealing bar is slidably mounted for forward and backward movement, so that the pulse heat sealing bar either contacts or is distanced from the label strip wound on the associated mandrel and the heating element is aligned with the vertical axis of the mandrel.

4. A labeling machine according to claim 3, further comprising means for moving the pulse heating sealing bar from a rest position to a contact position with the label strip for a time sufficient to seal it and then to retract the pulse heating sealing bar from the contact position to the rest position.

5. A labeling machine according to claim 1, wherein the pulse heating sealing bars are positioned on the carousel, internally with respect to the mandrels, and each of said pulse heating sealing bars is aligned with a radius of the carousel.

6. A labeling machine according to claim 1, wherein the sealing station is located at an angularly spaced downstream position with respect to the label feeder, in operative connection with a circular-arc portion of the carousel.

7. A labeling machine according to claim 6, wherein the pulse heating sealing bars are slidably mounted on a closed-loop conveyor, a portion of which describes an arc of a complementary shape with respect to the circular-arc portion of the carousel.

8. A labeling machine according to claim 7, wherein the closed-loop conveyor is driven in such a way, so that the pulse heating sealing bars move along the closed-loop conveyor synchronously with respect to the mandrels on the carousel.

9. A labeling machine according to claim 1, wherein the sealing station is modular and is removably linked to the sealing station to the periphery of the frame of carousel, so that it can be removed or moved to different sections of the carousel.

10. A labeling machine according to claim 1, wherein the number of said pulse heating sealing bars in the sealing station is a sub-multiple of the number of mandrels in the carousel.

11. A bottle labeling machine, said machine comprising
a carousel having mandrels with flat tops for supporting bottles placed thereon,
a bottle feeder for placing bottles on the mandrels,
actuators for rotating each said mandrel about its axis and for allowing the mandrel to move vertically along its axis,
a setting mechanism for holding tops of the bottles while the bottles are on the mandrels,
a cutting mechanism for cutting individual labels from a continuous strip of heat-shrinkable film,
a wrapping mechanism for wrapping the individual labels about respective bottles,
a sealing mechanism for interconnecting the ends of the labels, wherein the sealing mechanism comprises a pulse heating bar having an electrical heating element and a channel through which a cooling fluid is circulated so that the bar is cooled immediately after contacting each individual label,
a slide mechanism, activated by said programmable logic controller, which moves said pulse heating sealing bar between a rest position, in which said pulse heating sealing bar is distanced from said overlapping ends, and a contact position, in which said heating element of said pulse heating sealing bar contacts said overlapping ends and seals said overlapping ends together to form a sleeve label,
a bottle remover for removing labeled bottles from the carousel, and
a conveyor for delivering the bottles to a device for heat-shrinking the labels on the bottles,
wherein each of said mandrels is slightly tapered upwardly to facilitate disengagement of labels from the mandrels.

12. The bottle labeling machine of claim 11, wherein the pulse heating bar has a heating rate of about 6000° K/sec and a cooling rate of about 3000° K/sec.

* * * * *